United States Patent [19]

Wallace

[11] 3,972,522

[45] Aug. 3, 1976

[54] DOCUMENT VIEW STATION
[75] Inventor: Harry L. Wallace, Garden City, Mich.
[73] Assignee: Burroughs Corporation, Detroit, Mich.
[22] Filed: Sept. 2, 1975
[21] Appl. No.: 609,222

[52] U.S. Cl. ................................ 271/64; 271/184; 271/225; 271/258
[51] Int. Cl.² ........................................ B65H 29/20
[58] Field of Search ............ 271/64, 225, 184, 185, 271/258, 265

[56] References Cited
UNITED STATES PATENTS
3,112,926  12/1963  Stuckens.............................. 271/64
FOREIGN PATENTS OR APPLICATIONS
573,694  2/1958  Italy.................................. 271/184

Primary Examiner—Richard A. Schacher
Attorney, Agent, or Firm—Ronald L. Taylor; Edwin W. Uren; Kevin R. Peterson

[57] ABSTRACT

Disclosed is a document view station adjacent to a document guideway that will, upon being alerted to a misread document, ready itself to intercept the misread document. Once intercepted the misread document may be cammed out of the guideway to a position where it may be easily viewed, tactilibly manipulated, and optionally cammed back to is original location in the document stream for further processing. The document view station additionally has the ability to self-adjust its camming to the width of the document.

38 Claims, 5 Drawing Figures

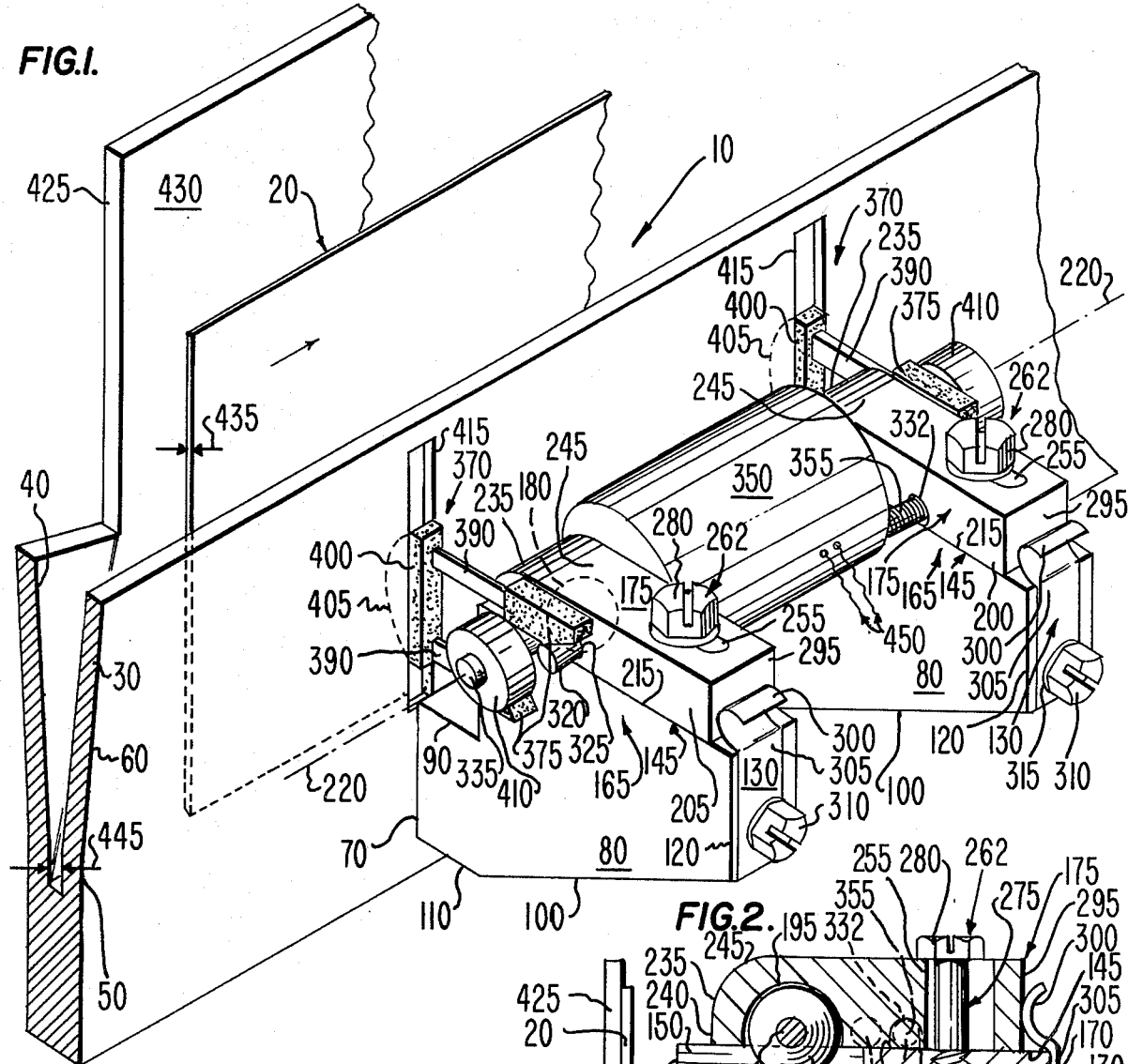
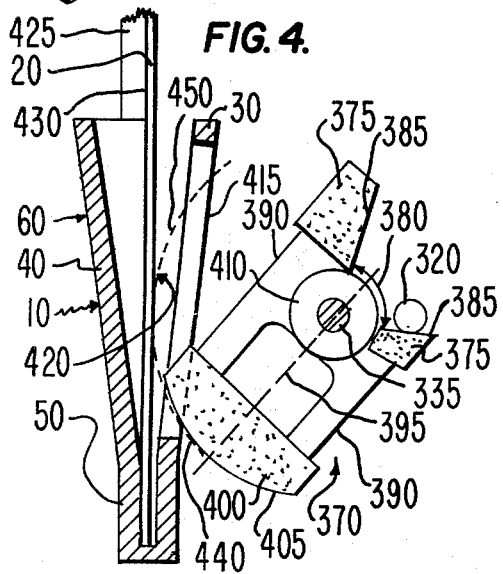
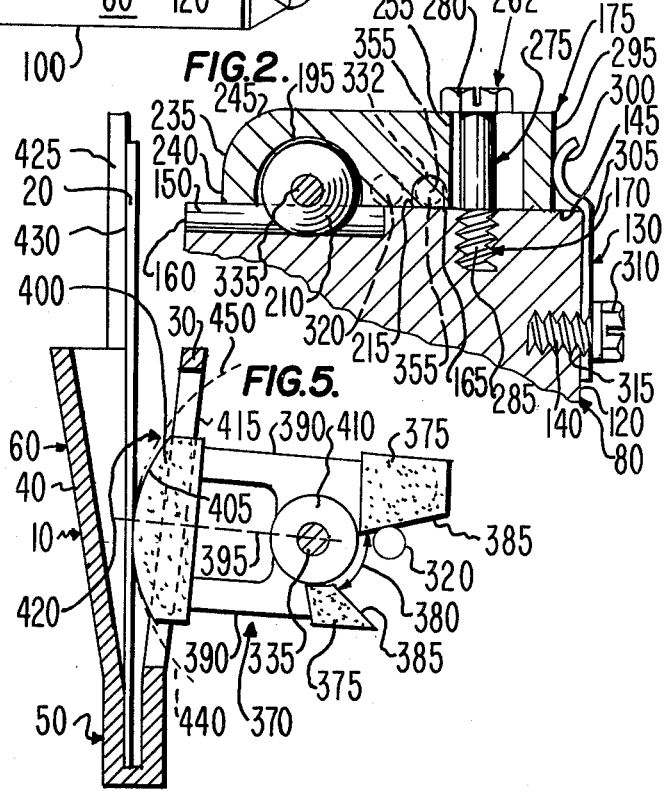

DOCUMENT VIEW STATION

BACKGROUND OF THE INVENTION

1. Field of the Invention

This invention relates to document view stations in general and particularly to document view stations able to cam documents out of a guideway for ease of viewing.

2. Prior Art

In the past where there was a document transport system comprising a reader that interfaced with an associated document guideway, documents flowing down the guideway that were misread would be rejected and diverted off from the main stream of documents for later off-line correction. This had the obvious disadvantage of temporarily losing those misread documents as to the current batch being processed. As such, the batch minus the misread documents would not accurately reflect the state of its source and thus would distort whatever the batch was updating as a reliable indicia.

Where systems do provide for on-line correction of misread documents without diversion, the misread documents would have to be physically removed from the guideway to view and assess the error. This would generally consist of actual tactile removal of the misread documents in the document guideway thus risking accidental multilation of documents in the process of removal.

Another related problem concerns the tactile reinserting of removed documents in the wrong place relative to the queued document stream in the guideway.

A final problem derives directly from the normal quality variance as to the width of the document guideway or the documents themselves. A device for automatically intervening to remove or reinsert documents in the document stream may apply too weak or too strong a normal pressure to a document being cammed depending on the actual width of the guideway or document.

SUMMARY OF THE INVENTION

It is thus an important object of the invention to provide a document view station that can intercept documents in a guideway that have been previously determined to require out of guideway viewing, convenient tactile manipulation of the removed documents and optional return of same said documents to their original location in the guideway.

It is a further object of the invention to be able to frictionally cam documents out of a guideway then cam them back to their original relative position in the guideway without direct tactile intervention during camming.

It is yet another object of the invention to be able to self-adjust the camming in the document guideway so as to apply at least a minimum pressure to even a relatively narrow width document.

It is another further object of the invention to be able to stop and reverse the direction of camming without clutching.

In carrying out the objects of the invention, a system is utilized whereby when a reader station indicates a misread document, a misread flagging signal will be delayably sent to a document view station at a time calculated to be coincidental to when the misread document will be passing by said document view station. Also concurrently with the sending of the misread signal, a document flow-stop signal will be sent to all feeder rollers along the guideway thereby interrupting the flow of documents. At this point, the misread document will be positioned directly adjacent to a camming mechanism of the document view station. The camming mechanism will then proceed to frictionally move in a tangential arc against the misread document pressing it against an opposing wall of the guideway while self-adjusting itself to the document's width. The document is then lifted up into a zone where it may be easily viewed by the operator and also tactilely manipulated if so needed. Once this is done, the operation of the camming mechanism may be reversed so as to place the document back to its original position relative to the flow of documents. With the knowledge gained from observing the document at the document view station, the operator may make any derived actual corrections of the misread document at a write station further downstream in the guideway.

BRIEF DESCRIPTION OF THE DRAWINGS

Various other objects, advantages and meritorious features of the invention will become more fully apparent from the following specification, appended claims and accompanying drawing sheets.

The features of a specific embodiment of the invention are illustrated in the drawings, in which:

FIG. 1 is a perspective view of the document view station of the invention;

FIG. 2 is a cut away side view of the self-adjusting mechanism of the document view station of FIG. 1;

FIG. 4 is a side view of the camming mechanism of the document view station of FIG. 1 as it begins its upward arc; and FIG. 5 is a side view of the camming mechanism of the document view station of FIG. 1 when it has finished its upward arc.

DESCRIPTION OF THE PREFERRED EMBODIMENT

Figure 3:
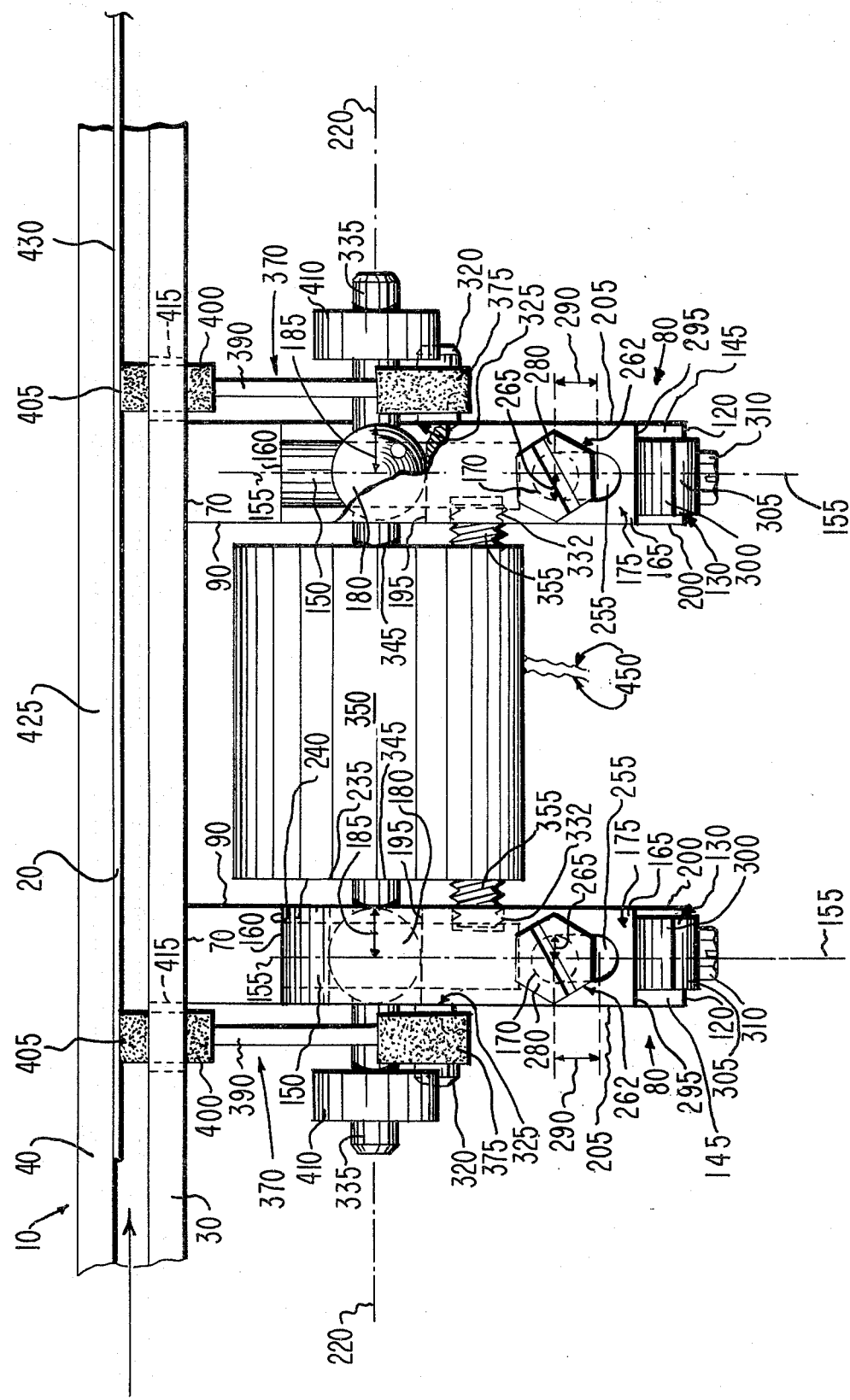
FIG. 3 is a top view of the self-adjusting mechanism of the document view station of FIG. 1.

Referring to FIGS. 1 through 5 by the characters of reference, there is illustrated an apparatus for carrying out the objects of the invention. In the preferred embodiment of the invention as shown in FIG. 1, there is a guideway 10 that serves as a channel or queue for a flow or stream of documents 20. The walls 30 and 40 of the guideway 10 are substantially parallel in their lower portion 50 so as to give lateral support to the documents 20 as they flow through. The walls 30 and 40 of the upper portion 60 of the guideway 10 are formed to increasingly diverge at relatively higher levels so as not to contact and thus unnecessarily bind the documents 20 in the course of their flow.

Abuttably supported at side 70 on the lower portion 50 of one 30 of the guideway's walls 30 and 40 hereinafter referred to as the near wall 30, is a pair of the abutting side of the frame member 80 is cut back at a right angle to provide clearance for the diverging upper portion 60 of the near wall 30. The bottom side 100 of the frame member is cut back at a diagonal running from the deep end 110 of the lower portion 50 of the near wall 30 out and away therefrom to also provide clearance. The side 120 of the frame member 80 opposite the abutting side 70 is substantially planar and parallel to the lower portion 50 of the near wall 30 thus enabling it to operatively mount a leaf spring 130 thereon as will be shown infra. A threaded bore 140 as shown in FIG. 2 is formed in the planar side 120 to provide the exact means for mounting the leaf spring 130 thereto as also will be seen infra. On the top side 145 of the frame member 80 in a portion adjacent the near wall 30 is formed a concave raceway 150 having a longitudinal axis 155 as shown in FIG. 3 perpendicular to the near wall 30 and open ended 160 on the right-angled cut-off side 90 facing the near wall. Formed in a rear portion 165 of the top side 145 is a threaded bore 170 to provide a means for attaching the frame member 80 to a cap member 175 as will be seen infra.

Sitting in the raceway 150 and freely able to rotate along the longitudinal axis 155 thereof when not otherwise restrained is a spherical bearing 180 as shown in FIGS. 2 and 3 whose radius 185 is only slightly less than the radius of the raceway 150 thus facilitating close tracking along the raceway 150. The spherical bearing 180 being operative to act as a buffer as between the cap member 175 and the frame member 80. The spherical bearing 180 may be composed of nylon or a similar self-lubricating material to minimize friction when the spherical bearing 180 moves in the raceway 150.

Acting as a cover for the top side 145 and as part of the self-adjusting mechanism is the aforementioned cap member 175, as further shown in FIGS. 1, 2 and 3, that may be formed of a metallic material. In a portion adjacent the near wall 30, the cap member 175 has formed therein a notch 195 traversing from the cap member's 175 inner 200 to outer lateral sides 205 and also being open 210 on the cap members 175 underside 215. The notches' 195 longitudinal axis 220 is perpendicular to the raceway's longitudinal axis 155 and has a radius only slightly larger than the radius 185 of the spherical bearing 180 as shown in FIG. 3. The notch 195 encompasses a top portion of the spherical bearing 180 and thus acts as a restraint that will guide the spherical bearing 180 to closely track only along the degrees of freedom allowed by the raceway 150. The edge 235 made by the end side 240 of the cap member 175 adjacent the near wall 30 and the top side 245 of the cap member 175 is slightly burred to give a convex edge to provide clearance for the diverging upper portion 60 of the guideway 10.

In a portion of the cap member 175 adjacent to the rear portion 165 of the frame member 80 is a smooth sided eccentrical bore 255 traversing from the cap member's top side 245 to its underside 215 and having a major radial axis that is coincidental with the raceway's longitudinal axis 155. Traversing the eccentrical bore 255 is a metal screw 262 having a radius 265 only slightly less than the radius of the minor radial axis of the eccentrical bore 255. The top portion 275 of the screw 262 adjacent to its head 280 is smooth to allow non-binding contact with the eccentrical bore 255. The bottom portion 285 of the metal screw 262 is threaded so as to be suitable for screwing into the threaded bore 170 on the top side 145 of the frame member 80. When the metal screw 265 is relatively loose, the cap member 175 may slidably change its position along its longitudinal axis relative to the coincidental longitudinal axis 155 of the raceway 150 for a distance approximately equal to the differential distance 290 between the foci of the eccentrical bore 255 as shown in FIG. 3. when the metal screw 265 is relatively tightened, the cap member 175 and raceway 150 are locked in relative position along their respective longitudinal axis 155 as to each other. As such, when screwably tightened the metal screw 265 acts as a lock slide in relation to the cap member 175.

Biasing the end side 295 of the cap member 175 directly opposite the near wall 30 is the afore-mentioned leaf spring 130 as particularly shown in FIG. 2 which is operative to apply a constant pressure against the cap member 175 in the direction of the near wall 30. The top portion 300 of the leaf spring 130 is curved convexly out to operatively contact the end side 295 of the cap member 175 opposite the near wall 30 while the bottom portion 305 or the planar end of the leaf spring 130 is restrained in place against the planar side 120 of the frame member 80. The actual restraint is accomplished by a metal screw 310 that traverses an aperture 315 in the planar end 305 of the leaf spring 130 to be screwed into the threaded bore 140 in the planar side 120 of the frame member 80. On the outer lateral side 205 of the cap member 175, midway along its longitudinal axis, 155 is a solid cylindrical projection or member 320 weldably abutting the cap member 175 at one end 325 for use as a stop as will be seen infra. Also midway of the cap member 175 is a notch 332 formed to open into the inner lateral side 200 and underneath 215 the cap member 175 for use as a restraint as also will be seen infra.

Radially tapping the spherical bearing 180 along the axis 220 perpendicular to the raceway's longitudinal axis 155 is a traversing shaft 335 again as shown in FIGS. 1 and 3 that may be formed of a metallic material and which is carried as a load by the spherical bearing 180. The spherical bearing 180, unless otherwise restrained, may freely rotate about and translate along the axis 220 of the shaft 335.

Connected to each of the inside ends 345 of the shafts 335 is a DC motor 350 shown in FIGS. 1 and 3 which is relatively low powered. The motor 350 provides the rotational energy to drive the shafts 335 in a direct-drive radial mode where the longitudinal axis 220 of the motor 350 is coincidental to that of the shaft's axis. Restraining the motor 350 from rotating in its own longitudinal axis 340 as it drives its shafts 335 is a metal projection or screw 355 parallel to the shaft's axis 220 that may be adjustably screwed in and and out of the motor 350. The metal screw 355 is operative to be fitted in the aforementioned restraint notch 332 which has a radius only slightly larger than that of the metal screw for predeterminably setting the relative position of the motor 350 as to the cap member 175.

Particularly shown in FIGS. 4 and 5, abutted on the outer end of the shaft 335 and having a plane of operation radially perpendicular to the shaft's axis 340 is an arm structure or camming mechanism 270 fixed to rotate with the shaft 335. Disposed on the arm structure 370 in a direction substantially opposite the near wall 30 is a pair of elongated projections 375 that are weighted and set a fixed arcuate distance 380 from each other relative to the shaft's axis 340. The weighting counteracts the moment generated by the remainder of the arm structure 370 thus assisting the generation of a center of gravity that is substantially in the shaft's axis 220 as will be seen infra. The fixed arcuate distance 380 comprises the acute angle of 60°. The pair of elongated projections 375 acting as an upper and lower limits are restrained in their travel about the shaft's axis 220 by the interposing aforementioned cylindrical stop member 320. Insulating the remainder of the arm structure 370 from the shock and vibration generated when one of the pair of elongated projections 375 makes contact with the stop member 320 is a resilient coating 385 such as rubber on all of the surfaces of the elongated projections 375 that actually contact the stop member 320. Disposed on the arm structure 370 substantially in the direction of the near wall 30 are a pair of parallel extension members 390 which are in turn parallel to an imaginary radial 395 from the shaft's axis 220. Disposed on both ends of the pair of extension members 390 spatially proximate to the near wall 30 is a shoe member 400 having a surface 405 as exposed in the direction of the near wall 30 that is slightly arcuate. The arcuate surface 405 serves to gradually engage and disengage documents 20 at the beginning and end of the camming arcs so as not to expose it to position jarring high impulse effects. The arcuate surface 405 of the shoe member 400 has a high friction coefficient sufficient to cam documents 20 up and down as explained infra and is additionally also highly resilient so as to also act as a shock and vibration buffer as between the cammed document 20 and the arm structure 370. The resilient coating on the arcuate surface 405 of the shoe member 400 may be formed of a rubber or rubber-like material.

A weighted collar 410 is disposed adjacent to and on the periphery of the arm structure 370 on a side opposite to the motor 350 and traversed by the shaft 335 with which it relates for generating a center of gravity that is substantially coincidental with the shaft's axis 220. The weighted elongated projections 375 and the collar 410 collectively counteract the moment generated by the relatively remote shoe member 400 and associated cammed document 20. As such, the opposing moments are effectively cancelled and the center of gravity will be substantially in the shaft's axis 220, as aforementioned mentioned, resulting in only a relatively small amount of rotational inertia at the shaft's axis 340 to be overcome by the DC motor 350. This allows a relatively low powered and thus economical motor 350 to be used to drive the shaft 335 and thus rotate the shoe member 400.

The shoe members 400 are able to interact with documents 20 in the guideway 10 by means of a pair of parallel and elongated apertures 415 in the near wall 30 of the guideway 10 that are also parallel and coincidental to the arc 420 of the shoe member 400 shown in FIG. 4 thereby allowing non-obstructed access to documents 20. The wall 40 opposite the near wall 30 in the guideway 12, hereinafter the far wall 40, in the vicinity 425 of the pair of elongated apertures 415 will become slightly less diverging in its upper portion relative to the remainder of the far wall for a distance of approximately eight inches. This slightly less diverging area or platen 425 of the upper portion 60 of the far wall 40 will extend upwards approximately three inches above the remainder of the far wall 40. The surface 430 which may be composed of a metallic material has a relatively low friction coefficient thus allowing documents 20 to slide easily thereon.

OPERATION

In the operation of the apparatus, the metal screw 262 shown in FIG. 2 traversing the eccentrical bore 255 may be tightened thus fixing the distance between the shoe member 400 and the platen 425 of the far wall 40 as a constant when the document width's 435 do not substantially vary as shown in FIG. 1. Alternatively, the metal screw 262 may be left relatively loose where the document width's 435 do vary. When the metal screw 262 is left loose, the leaf spring 130 will operate to apply a constant bias to the cap member 175. This enables the shoe member 400 to always return to a predetermined locus of points comprising the camming arc 420 in the guideway 10 as between the far wall 40 and near wall 30 as shown in FIGS. 2 and 3 whenever a non-normal width document 20 flows through temporarily biasing the shoe member 400 back towards the near wall 30. This allows the shoe member 400 to always apply at least a minimum pressure even against a narrow width document 20 and thus also the platen 425 whenever the shoe member 400 is in the guideway 10 at the lower end 440 of its operating arc 420. As such, the metal screw 262 in its loose condition can be said to give the shoe member 400 a self-adjusting ability relative to varying document width's 435 and may even be adjusted for differing guideway channel widths 445 as shown in FIG. 1.

The motor 350 may be activated to rotate its shafts 335 whenever a DC bias is applied through the wires 450 to the motor 350. The shaft 335 in turn will rotate the arm structure 370 and the associated shoe member 400 until one of the elongated projections's 370 hits its associated stop member 320 as shown in FIGS. 4 and 5. It will be noted that potential bias may be applied to the motor 350 constantly, but the shaft 335 will not rotate beyond a certain point once one of the elongated projections 370 engage the associated stop member 320. Once so engaged to be stopped, rotation may be had only in the opposite or reverse direction and only after the polarity of the bias applied on wires 450 to the motor 350 is switched. As such, this eliminates the need for any type of expensive clutching assembly since all movement direction can be controlled by merely switching bias polarity as applied to the motor 350.

Once the shoe member 400 begins its arc upwards, it will enter the guideway 10 through the elongated apertures 415 and tangentially contact the selected document 20. The selected document 20 to be intercepted or detained will then be cammed upward in the guideway by the high friction surface 405 of the shoe member 400 pressing the selected document 20 against the support providing low friction surface 430 of the platen 425 thus allowing the selected document 20 to slide only on the platen side 430. As the document 20 continues to be cammed upwards by the shoe member 400, it will gradually reach the upper portion 450 of its arc 420 as shown in FIG. 5 where the far wall 40 begins to only slightly diverge out. As such, the effective pressure and resultant frictional coefficient that the shoe member 400 is able to apply against the selected document 20 will gradually begin to fall off since the platen 425 and the arcuate surface 405 of the shoe member 400 in its upward arc 450 begins to slightly diverge relative to each other. This condition exists even when the metal screw 262 is loose, as the bias applied by the leaf spring 130 may only push the shoe member towards the far wall 40 to a predetermined point along the locus of points on the arc 420 as mentioned supra and will not follow the diverging platen 425 beyond that locus. As such, at the top of the arc 450 of the shoe member 400, the selected document 20 will be held in position by the shoe member 400 only at a minimum pressure and thus may be easily tactilely removed. If it is desired, the document 20 may be cammed back into its original relative position in the guideway 10 by merely reversing the above-described operation.

While the above-referenced embodiments of the invention have been described in considerable detail with respect to the apparatus thereof, it will be appreciated that other modifications and variations therein may be made by those skilled in the art without departing from the true spirit and scope of the invention.

What is claimed is:

1. A document station apparatus for interceptibly removing selected documents from a flow of documents for purposes of viewing and tactile manipulation, said apparatus comprising:
   a. guideway means including a pair of walls for channeling the flow of documents therebetween;
   b. power means for providing rotational energy along the axis of said power means;
   c. a pair of frame means disposed on one of the pair of walls of said guideway means for operatively supporting said power means; and
   d. camming means radially disposed along the axis of said power means and traversing one of the pair of walls of said guideway means for frictionally engaging the selected documents in said guideway means and for applying sufficient holding pressure on the selected document as backed by the other of the pair of walls of said guideway means to arcably cam the selected document up and out of said guideway means.

2. The document station apparatus according to claim 1 wherein the pair of walls of said guideway means are substantially parallel in their lower portion.

3. The document station apparatus according to claim 1 wherein the pair of walls of said guideway means are substantially diverging as to each other in their upper portion.

4. The document station apparatus according to claim 3 wherein the other of said pair of walls of said guideway means, in the vicinity where documents are engaged by said camming means, is relatively less diverging in its upper portion than the remainder of that wall.

5. The document station apparatus according to claim 4 wherein the relatively less diverging upper portion of the other of said pair of walls of said guideway means extends relatively higher than the remainder of that wall.

6. The document station apparatus according to claim 4 wherein the relatively less diverging upper portion of the other of said pair of walls of said guideway means has a relatively low friction coefficient on the surface of its side adjacent to documents in said guideway means.

7. The document station apparatus according to claim 1 wherein the one of the pair of walls of said guideway means has one or more elongated apertures formed therein coincidental to the arc made by said camming means for facilitating the traversing by said camming means into said guideway means to engage the documents.

8. The document station apparatus according to claim 1 wherein said power means further includes one or more adjustable projections formed therein to be screwably positioned so that they may be restrained by said frame means for fixing the position of said power means relative to said frame means.

9. The document station apparatus according to claim 1 wherein said power means is an electric motor.

10. The document station apparatus according to claim 9 wherein said electric motor is a direct current motor whose direction may be reversed by switching the polarity of the bias applied to the motor.

11. The document station apparatus according to claim 1 wherein the pair of said frame means include an axis that is substantially transverse to said guideway means.

12. The document station apparatus according to claim 11 wherein the pair of said frame means each have a top side that is substantially planar and transverse to said guideway means, and a side opposite to that disposed on one of the pair of said walls that is substantially planar and parallel to said guideway means.

13. The document station apparatus according to claim 11 wherein said power means further comprises a shaft means axiably extending from either end of said power means and radially connected to said camming means for transferring power from said power means to said camming means.

14. The document station apparatus according to claim 13 wherein the pair of said frame means further comprises a pair of cap means each disposed to have its axis substantially coincidental with and over each of the pair of said frame means and further being disposed between said power means and said camming means for supportably restraining said shaft means to rotate in its own axis.

15. The document station apparatus according to claim 14 wherein each of the pair of said pair of frame means has disposed on a side opposite said guideway means, biasing means operative to apply pressure to an end of said cap means also opposite said guideway means for biasing said cap means towards said guideway means.

16. The document station apparatus according to claim 15 wherein said biasing means is a leaf spring having a planar end disposed on each of the pair of said frame means and having a convex end biasing said cap means.

17. The document station apparatus according to claim 14 wherein said cap means having a smooth sided eccentrical bore having a major axis coincidental to the axis of said cap means further comprises a metal screw means having a smooth upper portion and a threaded lower portion operative to traverse the eccentrical bore of said cap means and into said frame means having a threaded aperture adapted to receive the threaded lower portion of said metal screw means for allowing said cap means and said frame means to be manually or self adjustably positioned along their coincidental axis relative to each other depending on whether said metal screw means has been relatively screwably tightened or untightened respectively.

18. The document station apparatus according to claim 14 wherein each of the pair of said frame means has formed along the top of each of said frame means a concave raceway whose axis is substantially coincidental to that of said frame means.

19. The document station apparatus according to claim 18 wherein said cap means has formed in its underside a notch in an area adjacent to the concave raceway of said frame means.

20. The document station apparatus according to claim 19 wherein each of the pair of said frame means further comprises a spherical bearing means operative to restrainably travel along the axis of concave raceway while being restrained overhead by the notch in said cap means and further being radially transversed by said shaft means for carrying said shaft means as a load and for acting as a buffer as between said cap means and said frame means.

21. The document station apparatus according to claim 18 wherein said cap means further comprises a stop projection extending out and away from each of the pair of said frame means to be in operative contact with said camming means for use as a limit at the arc camming ends when said camming means approaches either end of its camming arc.

22. The document station apparatus according to claim 21 wherein said camming means further comprises a pair of elongated projections radially disposed about said shaft means in a direction opposite to said guideway means and operative to act as an upper and lower limit for the camming arc of said camming means when contact is made with said stop projection.

23. The document station apparatus according to claim 22 wherein the pair of said elongated projections are disposed from each other at or less than an acute angle along the camming arc.

24. The document station apparatus according to claim 21 wherein the pair of said elongated projections are weighted to counteract the moment generated by the remainder of said camming mechanism for assisting the generation of a center of gravity substantially about the axis of said shaft means.

25. The document station apparatus according to claim 21 wherein the pair of said elongated projections are coated with a resilient material in the area making contact with said stop projection for insulating the remainder of the camming means from shock and vibration generated by the contact of one of the pair of elongated projections with said stop projection.

26. The document station apparatus according to claim 13 wherein said camming mechanism further comprises one or more arms radially disposed from said shaft means towards said guideway means.

27. The document station apparatus according to claim 26 wherein said camming mechanism further comprises shoe means disposed on the ends of said arms for cammably engaging the documents in said guideway means.

28. The document station apparatus according to claim 27 wherein said shoe means has a relatively high friction coefficient on the surface area actually engaging the document for assuring firm contact therewith.

29. The document station apparatus according to claim 27 wherein said shoe means has a resilient coating on the surface area actually engaging the document for action as a shock and vibration buffer as between the document and said camming means.

30. The document station apparatus according to claim 27 wherein said shoe means has a slightly arcuate shape formed on the surface area actually engaging the document for gradually engaging and disengaging the document at the beginning and end of the camming arc so as to disllow position jarring high impulse effects.

31. The document station apparatus according to claim 30 wherein said guideway means has one or more aperture means formed in the one of the pair of said walls for allowing said shoe means of said camming means to travel therethrough in its arc to cammingly engage the document in said guideway means.

32. The document apparatus means according to claim 31 wherein the other of the pair of said walls diverges relatively less and extends relatively higher than the remainder of the other of the pair of said walls from the vertical in the vicinity of the aperture means formed in the one of the pair of said walls for allowing said shoe means to maintain sufficient holding pressure as it cams the document to the top of its arc even as it diverges slightly from the other of the pair of said walls while not so much as to disallow tactile manipulation of the document at the arc top.

33. The document apparatus means according to claim 32 wherein the other of the pair of said walls in the vicinity of the aperture means formed in the one of the pair of said walls has a relatively low friction coefficient on the surface area adjacent to the document for high slippage as between the document and the surface of the other of the pair of said walls.

34. The document apparatus means according to claim 13 wherein said camming mechanism further comprises weighted collar means radially disposed on said shaft means at the periphery of said camming means for counteracting the moment generated by the remainder of the camming mechanism for assisting the generation of a center of gravity substantially about the axis of said shaft means.

35. A document interception device including a guideway having a pair of walls for removing and reentering selected documents from the guideway without loss of position in the document queue, said device comprising:
   a. motor means for providing rotational energy along its axis;
   b. a pair of frame means disposed on one of the pair of walls of the guideway for providing operative support to said motor means; and
   c. engaging means radially disposed along the axis of said motor means and traversing one of the pair of walls of the guideway for frictionally camming the selected documents in the guideway and for applying sufficient holding pressure on the selected document as backed by the other of the pair of walls of the guideway to arcably engage the selected document up and out of the guideway.

36. A document engaging mechanism for detainably removing selected documents from a stream of documents for viewing and possible tactile manipulation, said mechanism comprising:
   a. guideway means including a pair of walls for channeling the stream of documents therebetween;
   b. power means operatively supported on one of the pair of walls of said guideway means for providing rotational energy along the axis of said power means; and
   c. camming means radially disposed along the axis of said power means and traversing one of the pair of walls of said guideway means for frictionally engaging the selected document in said guideway means and for applying sufficient holding pressure on the selected document as backed by the other of the pair of walls of said guideway means to arcably cam the selected document up and out of said guideway means.

37. A document removal system for removing and optionally re-entering selected documents from a document queue for purposes of viewing and possible tactile manipulation, said system comprising:
   a. a document guideway including a pair of walls for channeling the document queue therebetween;
   b. a motor for providing rotational energy along the axis of said motor;

c. a pair of frame members disposed on one of the pair of walls of the document guideway for operatively supporting said motor; and d. a camming mechanism radially disposed along the axis of said motor and traversing one of the pair of walls of said document guideway for frictionally engaging the selected document in said document guideway and for applying sufficient holding pressure on the selected document as backed by the other of the pair of walls of said document guideway to arcably cam the selected document up and out of said document guideway.

38. A method for interceptibly removing selected documents from a document flow for viewing and optionally tactilely manipulating the selected documents, said method comprising the steps of:

a. providing a document guideway including a pair of walls for channeling the document flow therebetween;

b. providing a motor for use as a source of rotational energy along the axis of the motor;

c. forming a pair of frame members disposed on one of the pair of walls of the document guideway for operatively supporting the motor; and d. providing a camming mechanism radially disposed along the axis of the motor and traversing one of the pair of walls of the document guideway for frictionally engaging the selected document in said document guideway and for applying sufficient holding pressure on the selected document as backed by the other of the pair of walls of the document guideway to arcably cam the selected document up and out of the document guideway.

* * * * *